United States Patent [19]

Vaughan

[11] Patent Number: 4,894,968
[45] Date of Patent: Jan. 23, 1990

[54] GLASS RUN CHANNEL WEATHER STRIP AND/OR BELT WEATHER STRIP RETAINING SYSTEM

[75] Inventor: Robert A. Vaughan, Dearborn, Mich.

[73] Assignee: The Standard Products Company, Cleveland, Ohio

[21] Appl. No.: 269,132

[22] Filed: Nov. 9, 1988

[51] Int. Cl.⁴ ............................................. E06B 7/16
[52] U.S. Cl. ...................................... 52/400; 52/401; 52/716; 49/462; 49/491
[58] Field of Search ................ 52/208, 397, 400, 401, 52/823, 716, 717; 296/93, 201; 49/440, 441, 462, 490, 491

[56] References Cited

U.S. PATENT DOCUMENTS

| | | |
|---|---|---|
| 1,896,632 | 2/1933 | Ledwinka . |
| 2,695,191 | 11/1954 | Naughton, Jr. ................. 296/28 |
| 2,733,097 | 1/1956 | Stevens ....................... 49/462 |
| 3,545,159 | 12/1970 | Cziptschirsch ............... 49/462 X |
| 4,072,340 | 2/1978 | Morgan ........................ 296/84 |
| 4,139,234 | 2/1979 | Morgan ........................ 296/84 |
| 4,696,128 | 9/1987 | Fukuhara ..................... 49/492 |

FOREIGN PATENT DOCUMENTS

| | | |
|---|---|---|
| 264563 | 1/1966 | Australia . |
| 596278 | 4/1960 | Canada ....................... 49/491 |
| 1148888 | 5/1963 | Fed. Rep. of Germany . |
| 626648 | 12/1926 | France . |
| 2384655 | 10/1978 | France . |
| 5833520 | 2/1983 | Japan . |
| 655299 | 2/1949 | United Kingdom .......... 49/491 |
| 707757 | 4/1954 | United Kingdom .......... 49/491 |

Primary Examiner—Carl D. Friedman
Assistant Examiner—Jerold D. Johnson
Attorney, Agent, or Firm—Harness, Dickey & Pierce

[57] ABSTRACT

An improved belt weather strip retaining system is disclosed. The system includes weather stripping adapted to be secured on the flange of a vehicle. The weather stripping includes members for retaining the weather stripping onto the flange. One or more discontinuities are formed on the flange. The one or more discontinuities are coupled with the weather stripping retaining members for enhancing retention of the weather stripping on the flange.

9 Claims, 1 Drawing Sheet

GLASS RUN CHANNEL WEATHER STRIP AND/OR BELT WEATHER STRIP RETAINING SYSTEM

BACKGROUND AND SUMMARY OF THE INVENTION

The present invention relates to automotive weather stripping and, more particularly, to an improved glass run channel and/or belt weather stripping retaining system.

Weather stripping is used in the automotive industry to seal components such as windows, doors, trunks, engine compartments or the like. Generally, the weather stripping is secured to a flange projecting from the component which is to be sealed. Designers strive to design weather stripping which requires a minimal force to position the weather stripping onto the flange and requires a substantial resistive withdraw force to remove the weather stripping from the flange. Several different types of weather stripping retaining systems exist in the art.

Systems which exist in the field are illustrated by the following U.S. patents. The systems are: U.S. Pat. Nos. 1,896,632, issued Feb. 7, 1933 to Ledwinka; 2,695,191, issued Nov. 23, 1954 to Naughton, Jr.; 4,072,340, issued Feb. 7, 1978 to Morgan; 4,139,234, issued Feb. 13, 1979 to Morgan; 4,696,128, issued Sept. 29, 1987 to Fukuhara; Australian Patent No. 264,563; Dutch Patent No. 1,148,888; French Patent Nos. 626,648 and 2,384,655; and Japanese Patent No. 58-33520. It should be noted that the list of patents is not exhaustive of the different types of retaining systems that exist in the field.

Accordingly, the present invention provides the art with an improved glass run channel and belt weather stripping retaining system. The present invention provides a glass run channel or belt weather stripping system that is easily positioned onto a flange or the like. The weather stripping requires a substantial withdraw force to remove the weather stripping from the flange.

From the subsequent description taken in conjunction with the appended claims and drawings, other objects and advantages of the present invention will become apparent to those skilled in the art.

DETAILED DESCRIPTION OF THE PREFERRED EMBODIMENTS

Figure 1:
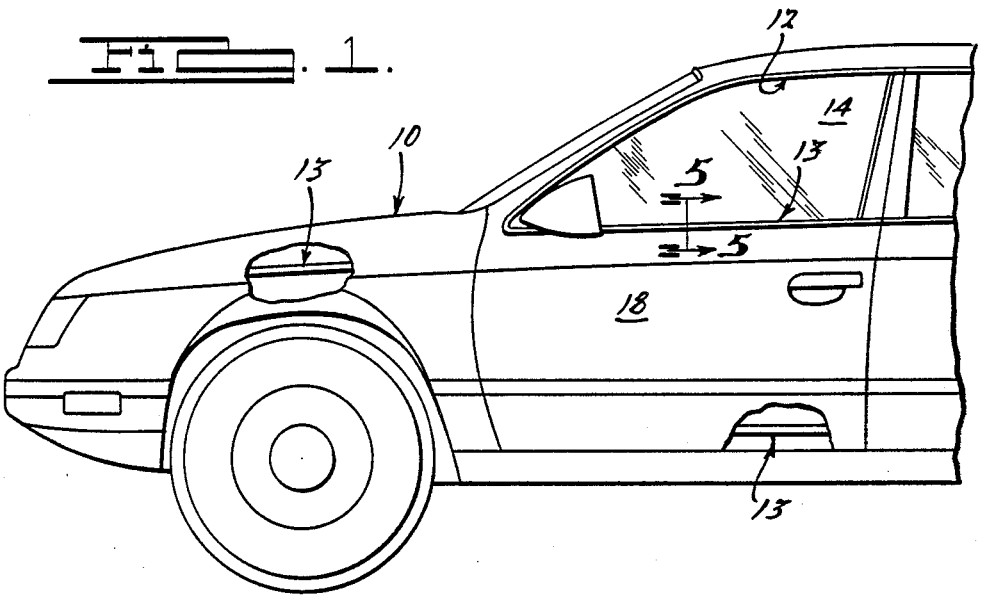
FIG. 1 illustrates a side view of an automobile including a weather stripping retaining system in accordance with the present invention.

Turning to the Figures, particularly FIG. 1, an automobile 10 is illustrated with weather stripping 12 and 13. The weather stripping 12, of the glass run variety, may be mounted about the periphery of the window opening 14 on a door 16. Also, the weather stripping 13, of the belt variety, may be utilized on the trunk, engine compartment, door or the like wherever belt weather stripping is conventionally utilized.

Figure 5:
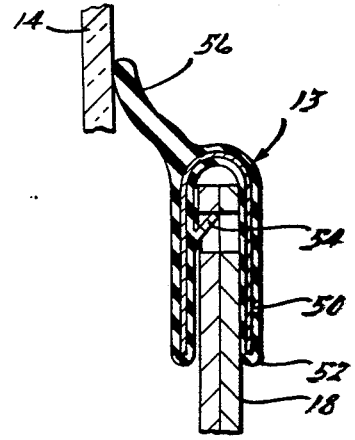
FIG. 5 is a vertical cross-section through the belt weather stripping taken along the plane defined by the line 5—5 thereof.
Figure 3:
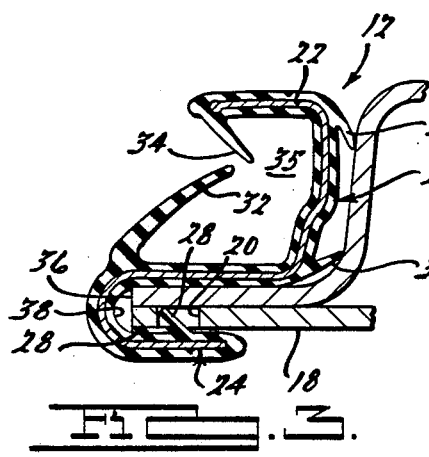
FIG. 3 is a horizontal cross-section taken along the plane defined by the line 3—3 thereof.
Figure 4:
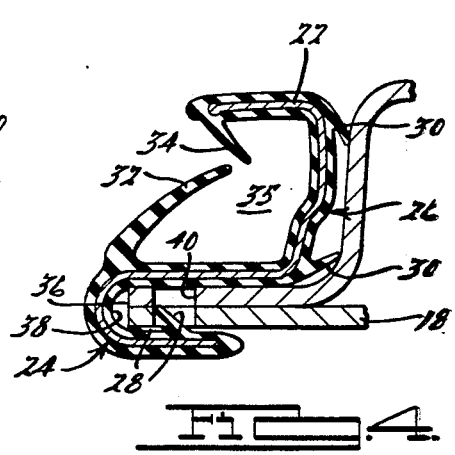
FIG. 4 is a horizontal cross-section like that of FIG. 3 of a second embodiment in accordance with the present invention.

The retaining system includes the weather stripping 12 or 13 and a flange 18. The flange 18 is generally formed during the stamping process of the door or the like. The flange 18 is comprised of two pieces of parallel metallic material that are joined together, by welding or the like, as illustrated in FIGS. 3 through 5. The flange 18 extends from the component a desired distance to enable weather stripping to be attached thereto.

Figure 2:
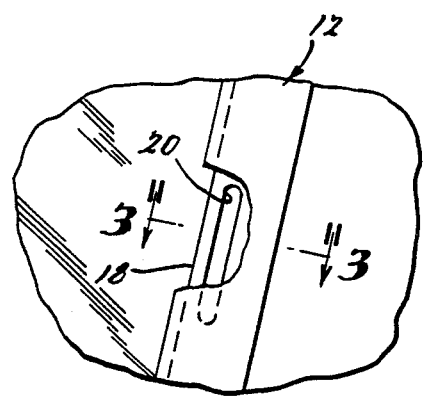
FIG. 2 is an enlarged side view of the weather stripping system with a portion broken away.

The flange 18 includes one or more discontinuities 20 to enhance retention of the weather stripping 12 and 13. The discontinuities 20 are positioned at desired spaced locations about the flange 18. The spacing is such that the weather stripping 12 and 13 is easily positioned onto the flange 18 and requires a substantial withdraw force to remove the weather stripping 12 and 13 from the flange 18. The discontinuities 20 may be elongated slots, like that shown in FIG. 2. The slots are generally cut through one thickness of the two thickness flange 18.

Generally, the glass run weather stripping 12 includes a metallic reinforcement member 22. The reinforcement member 22 may be formed from flexible wire, lanced or perforated metal cores or a solid metal core as shown. The reinforcement member 22 includes a U-shaped channel portion 24 to fit about the flange 18. The reinforcement member 22 is covered with a polymeric skin 26 which surrounds the interior and exterior of the metallic member 22. Generally, the skin 26 includes polymeric retention members 28 to retain the flange 18 within the U-shaped channel portion 24. Also, sealing members 30 extend from the skin 26 on the exterior of the reinforcement member 22 to seal the door 16. In FIG. 3, members 32 and 34 act to receive and seal a window which is positioned in a channel 35 within the weather stripping 12.

The U-shaped portion 24 of the glass rung weather stripping reinforcement member 22 is positioned onto the flange 18. The weather stripping 12 is easily slid onto the flange 18 such that the free depending end 36 of the flange 18 moves toward the closed end 38 of the U-shaped channel 24. As this occurs, a retention member 28 moves into the discontinuity on the flange 18, as shown in FIG. 3.

Once it is desirous to remove the weather stripping 12 from the flange18, the retention members 28 exhibit excellent retention characteristics to retain the weather stripping 12 onto the flange 18. As the weather stripping 12 is removed from the flange 18, the retention members 28 flex back upon themselves within the discontinuity 20 to exert a retaining force by the weather stripping 12 onto the flange 18. Once a threshold force has been exerted on the weather stripping 12 to overcome the retaining force, the retention member 28 gives and moves underneath the discontinuity 20, out from within the discontinuity 20, to enable removal of the weather stripping 12 from the flange 18.

FIG. 4 illustrates another embodiment of the present invention. In FIG. 4, the weather stripping 12 is substantially the same as that illustrated in FIG. 3 and the reference numerals which are the same will be marked as such. The one or more discontinuities 20 of FIG. 4 are elongated aperture 40 that extends through the two thicknesses of the flange 18. The aperture 40 provides the flange 18 with the same retention characteristics as explained herein.

FIG. 5 illustrates a cross-section view of the belt weather stripping 13. The belt weather stripping 13 is similar to that previously described. However, the belt weather stripping 13 includes only a U-shaped reinforcement member 50. The U-shaped reinforcement member is similar to that previously described. Also, the belt weather stripping includes a polymeric skin 52 with retention members 54 to retain the flange 18 within the U-shaped reinforcement member as explained above. Optional sealing members 56 may be included on the belt weather stripping 13.

While the above detailed description describes the preferred embodiment of the present invention, it will be understood that the present invention is susceptible to modification, variation and alteration without varying from the scope and fair meaning of the subjoined claims.

What is claimed is:

1. A system for attaching automotive weather stripping on a vehicle comprising:

weather stripping adapted to be secured on a flange of the vehicle, said weather stripping including a reinforcement member covered with a polymeric skin which surrounds the interior and exterior of said reinforcement member and means for retaining said weather stripping on the flange, said retaining means extending from said reinforcement member and integrally formed with said polymeric skin; and one or more indentations on said flange, said one or more indentations coupled with said weather stripping retaining means such that said retaining means projects into said one or more indentations for enhancing the retention of said weather stripping on said flange.

2. The system according to claim 1 wherein said weather stripping means for retaining includes one or more members extending from a wall of a U-shaped channel of said reinforcement member.

3. The system according to claim 2 wherein said one or more indentations include one or more elongated slots, said one or more members engaging said one or more elongated slots for retaining said weather stripping on said flange.

4. The system according to claim 1 wherein said one or more indentations include one or more elongated slots in said flange.

5. The system according to claim 4 wherein said one or more elongated slots extending partially through the thickness of said flange.

6. A system for attaching automotive weather stripping comprising:

an automotive vehicle having a member defining an opening for a window or the like, said member including a periphral flange extending inward into the opening;

one or more slots on said flange; and weather stripping adapted to be secured on said flange, said weather stripping including a reinforcement member covered with a polymeric skin which surrounds the interior and exterior of said reinforcement member and means for retaining said weather stripping on said flange, said retaining means extending from said reinforcement member and integrally formed with said polymeric skin such that said one or more slots are coupled with said weather stripping retaining means such tht said retaining means extends within said one or more slots for enhancing the retention of said weather stripping on said flange.

7. The system according to claim 6 wherein said weather stripping means for retaining includes one or more members extending from a wall of a U-shaped channel of said reinforcement member.

8. The system according to claim 7 wherein said one or more members engaging said one or more slots for retaining said weather stripping on said flange.

9. The system according to claim 6 wherein said one or more slots are elongated.

* * * * *